(12) United States Patent
Sin et al.

(10) Patent No.: US 7,239,478 B1
(45) Date of Patent: Jul. 3, 2007

(54) WRITE ELEMENT FOR PERPENDICULAR RECORDING IN A DATA STORAGE SYSTEM

(75) Inventors: Kyusik Sin, Pleasanton, CA (US); Yinshi Liu, Foster City, CA (US); Benjamin Chen, San Jose, CA (US); Francis H. Liu, Fremont, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 356 days.

(21) Appl. No.: 10/769,409

(22) Filed: Jan. 31, 2004

(51) Int. Cl.
*G11B 5/127* (2006.01)

(52) U.S. Cl. .................................................. 360/126

(58) Field of Classification Search ................ None
See application file for complete search history.

(56) References Cited

U.S. PATENT DOCUMENTS

| | | | |
|---|---|---|---|
| 4,656,546 A | | 4/1987 | Mallory |
| 5,089,334 A | * | 2/1992 | Mallary et al. .............. 428/336 |
| 5,768,065 A | * | 6/1998 | Ito et al. ..................... 360/322 |
| 6,804,083 B2 | * | 10/2004 | Takeya ....................... 360/122 |
| 2002/0176214 A1 | * | 11/2002 | Shukh et al. ............... 360/317 |
| 2003/0112555 A1 | * | 6/2003 | Sato et al. .................. 360/126 |
| 2003/0193742 A1 | * | 10/2003 | Matono et al. ............. 360/126 |
| 2004/0061988 A1 | * | 4/2004 | Matono et al. ............. 360/327 |
| 2005/0068669 A1 | * | 3/2005 | Hsu et al. ................... 360/125 |
| 2005/0229387 A1 | * | 10/2005 | Watabe et al. ........... 29/603.16 |

OTHER PUBLICATIONS

Mallary et al., "One Terabit Per Square Inch Perpendicular Recording Conceptual Design", IEEE Transactions on Magnetics, vol. 38, No. 4, Jul. 2002, pp. 1719-1724, US.

* cited by examiner

*Primary Examiner*—Brian E. Miller
(74) *Attorney, Agent, or Firm*—Jonathan E. Prejean, Esq.

(57) ABSTRACT

A write element for perpendicular recording in a data storage system is fabricated to maintain the thickness of a side shield at both edges of a pole P3, and to form the pole P3 in a trapezoidal shape. Forming a side shield around the pole P3 removes stray fields, creating a quiet, noise-free write element and preventing side erasure. The fabrication method utilizes a magnetic buffer layer to protect a shield gap during trim of the pole P3, and thus to provide the shield gap with a uniform thickness. The magnetic buffer layer also protects the shield gap and pole P3 when the top hard mask is removed. Consequently, the write field is made uniform across the track width. The fabrication method uses a metal in the shield gap to improve the pole geometry after pole trim and to provide a uniform edge to the pole P3.

87 Claims, 17 Drawing Sheets

WRITE ELEMENT FOR PERPENDICULAR RECORDING IN A DATA STORAGE SYSTEM

FIELD OF THE INVENTION

The present invention generally relates to data storage systems such as disk drives, and it particularly relates to a recording element for use in such data storage systems. More specifically, the present invention relates to a method of fabricating write element comprising a shield, a shield gap, and a pole P3, for perpendicular recording in a data storage system.

BACKGROUND OF THE INVENTION

Conventional magnetic storage systems comprise a thin film magnetic element with an inductive recording element mounted on a slider. The magnetic element is coupled to a rotary actuator magnet and a voice coil assembly by a suspension and an actuator arm positioned over a surface of a spinning magnetic disk. In operation, a lift force is generated by the aerodynamic interaction between the magnetic element and the spinning magnetic disk. The lift force is opposed by equal and opposite spring forces applied by the suspension such that a predetermined flying height is maintained over a full radial stroke of the rotary actuator assembly above the surface of the spinning magnetic disk.

An exemplary recording element comprises a thin film write element with a bottom pole P1 and a top pole P2. The pole P1 and pole P2 have a pole tip height dimension commonly referenced as "throat height". In a finished write element, the throat height is measured between an air bearing surface (ABS) and a zero throat level where the pole tip of the write element transitions to a back region. The air-bearing surface is formed by lapping and polishing the pole tip. A pole tip region is defined as the region between the ABS and the zero throat level. The pole P1 and pole P2 each have a pole tip located in the pole tip region. The tip regions of the pole P1 and pole P2 are separated by a magnetic recording gap, which is a thin layer of insulation material.

The current trend in data storage systems strives for higher storage densities. Recording densities are increasing to meet the requirements to store large amounts of information. At higher recording densities (i.e., above 100 Gb/in$^2$), perpendicular recording elements are utilized. Perpendicular recording elements can support higher recording densities because of a smaller demagnetization field in the recorded bits.

One typical perpendicular recording element utilizes three poles, P1, P2, and P3. Magnetic flux emanates from the pole P3 into the recording media and returns to the poles. Writing occurs at the pole P3. The recording resolution depends on the size and shape of the pole P3 rather than the gap length. In the perpendicular recording element, the gap between pole P1 and pole P3 is larger than allowed by longitudinal recording element designs, eliminating the need for a pole P1 pedestal.

As recording density increases, track distance decreases. For small track distances, a pole P3 may introduce adjacent track erasing if the pole P3 tip is shaped as a square. What is needed is a single pole element formed in a trapezoidal shape to eliminate the adjacent track erasing. In addition, the linear recording density can be further improved when a shield is added adjacent to the pole P3. The shielded perpendicular writer also provides a higher write-field gradient and reduced transition region in the recorded bits, improving linear density and reducing media noise.

The shielded perpendicular recording element presents distinct advantages for high-density recording. However, the fabrication of the shield and shield gap required by pole P3 may damage pole P3, or may create a shield gap at that is thinner at both edges of pole P3. Field leakage occurs through the thin gap region, resulting in reduced recording element efficiency.

What is therefore needed is a method for fabricating a shield and shield gap for the perpendicular recording element that maintains a uniform thickness of the shield gap without damaging the pole P3 during fabrication. The need for such a fabrication method and resulting write element has heretofore remained unsatisfied.

SUMMARY OF THE INVENTION

The present invention satisfies this need, and presents a fabrication method (referred to herein as "the method" or "the present method") for fabricating write element for perpendicular recording in a data storage system that maintains the uniformity of the thickness of the side shield at both edges of pole P3, and that further allows pole P3 to be formed in a desired shape, preferably a trapezoidal shape. Forming the side shield around pole P3 removes the stray field from around pole P3, creating a quiet, noise-free write element and preventing or significantly minimizing side erasure.

The present method utilizes a magnetic buffer layer to protect the shield gap during trim of pole P3, to provide a shield gap with a uniform thickness. The magnetic buffer layer also protects the shield gap and P3 pole when a top hard mask is removed. Consequently, the write field is uniform across the track width.

A hard mask placed above the shield gap and a magnetic buffer layer allows the formation of the trapezoidal shape of pole P3. The present method uses a metallic material in the shield gap to improve the pole geometry after pole trim and to provide a uniform edge to pole P3. This distinctive step distinguishes over the use of a non-metallic material, such as alumina, as a shield gap, which results in a non-uniform edge to pole P3 because of the smaller mill rate between the pole materials and gap materials.

DETAILED DESCRIPTION OF PREFERRED EMBODIMENTS

Figure 1:
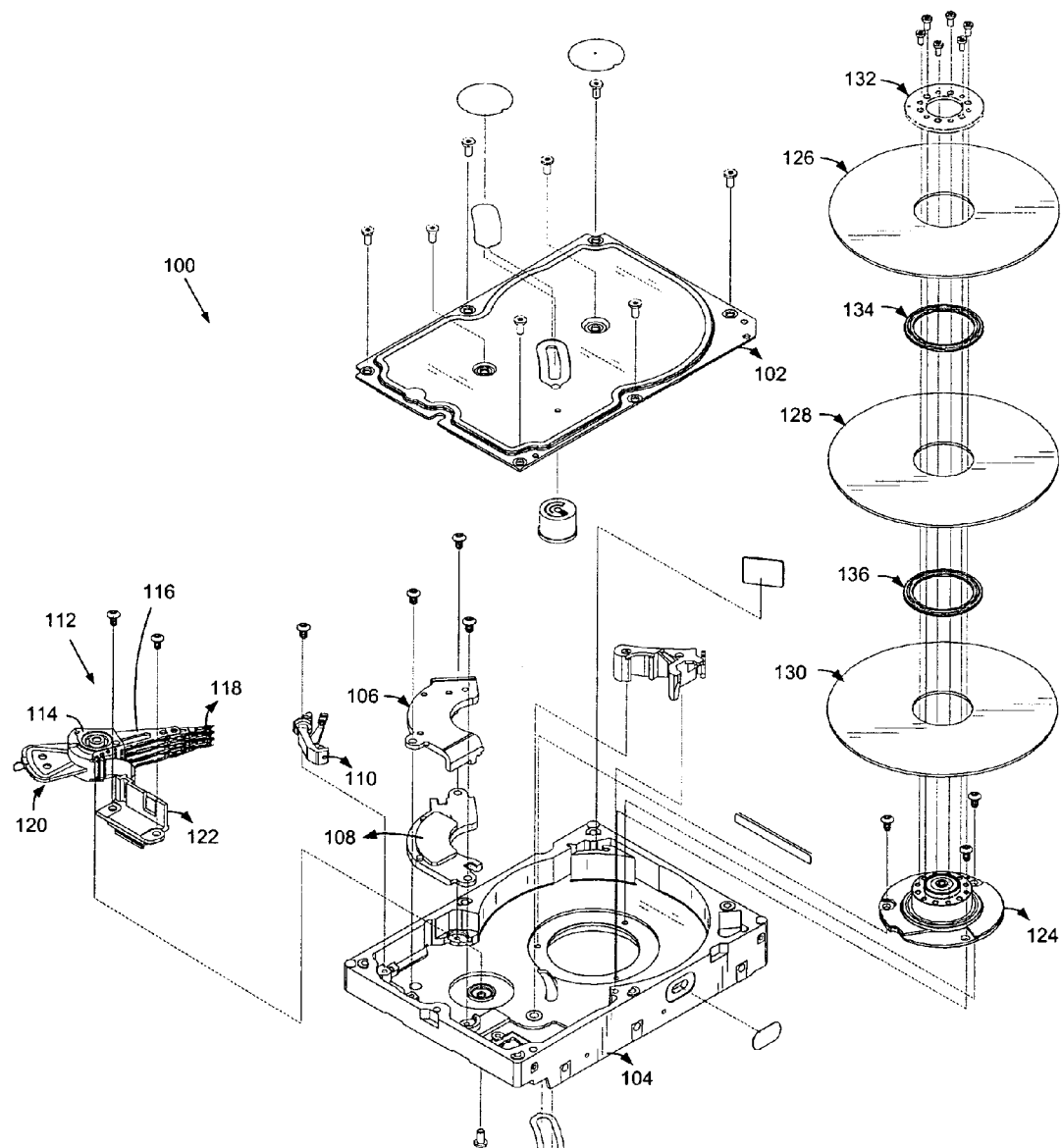
FIG. 1 is a fragmentary perspective view of a data storage system in which a write element of the present invention can be used.

FIG. 1 illustrates a hard disk drive 100 in which an embodiment of the present invention may be used. An enclosure of the hard disk drive 100 comprises a base 104 and a cover 102. The enclosure is suitably sealed to provide a relatively contaminant-free interior for a head disk assembly (HDA) portion of the hard disk drive 100. The hard disk drive 100 also comprises a printed circuit board assembly (not shown) that is attached to base 104 and further comprises the circuitry for processing signals and controlling operations of the hard disk drive 100.

Within its interior, the hard disk drive 100 comprises a magnetic disk 126 having a recording surface typically on each side of the disk, and comprises a magnetic head or slider which may suitably be a magneto-resistive ("MR") head such as a GMR head having an MR element for reading stored data on a recording surface and an inductive element for writing data on the recording surface. The exemplary embodiment of the hard disk drive 100 illustrated in FIG. 1 comprises three disks 126, 128, and 130 providing six recording surfaces, and further comprises six magnetic heads.

Disk spacers such as spacers 134 and 136 are positioned between disks 126, 128, 130. A disk clamp 132 is used to clamp disks 125, 138, 130 on a spindle motor 124. In alternative embodiments, the hard disk drive 100 may comprise a different number of disks, such as one disk, two disks, and four disks and a corresponding number of magnetic heads for each embodiment. The hard disk drive 100 further comprises a magnetic latch 10 and a rotary actuator arrangement. The rotary actuator arrangement generally comprises a head stack assembly 1112 and voice coil magnet ("VCM") assemblies 106 and 108. The spindle motor 124 causes each disk 126,128, 130 positioned on the spindle motor 124 to spin, preferably at a constant angular velocity.

A rotary actuator arrangement provides for positioning a magnetic head over a selected area of a recording surface of a disk. Such a rotary actuator arrangement comprises a permanent-magnet arrangement generally including VCM assemblies 106, 108, and head stack assembly 112 coupled to base 104. A pivot bearing cartridge is installed in a bore of the head stack assembly 112 and comprises a stationary shaft secured to the enclosure to define an axis of rotation for the rotary actuator arrangement. The head stack assembly 112 comprises a flex circuit assembly and a flex bracket 122. The head stack assembly 112 further comprises an actuator body 114, a plurality of actuator arms 116 cantilevered from the actuator body 114, a plurality of head gimbal assemblies 118 each respectively attached to an actuator arm 116, and a coil portion 120. The number of actuator arms 116 and head gimbal assemblies 118 is generally a function of the number of disks in a given hard disk drive 100.

Figure 2:
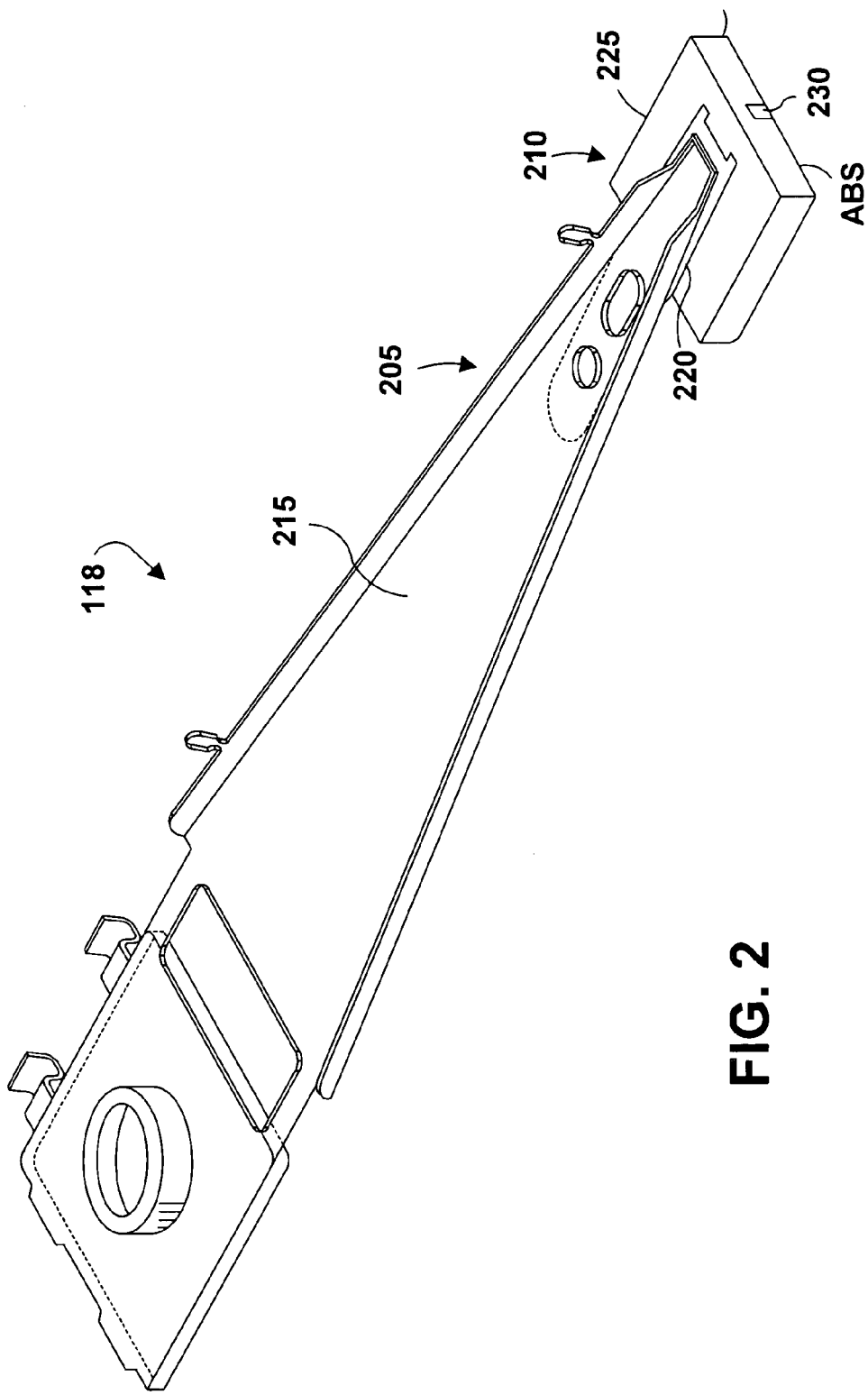
FIG. 2 is a perspective view of a head gimbal assembly comprised of a suspension, and a slider to which the write element of the present invention is secured, for use in a head stack assembly.

The head gimbal assembly (HGA) 118 is secured to each of the actuator arms 116. As illustrated in FIG. 2, HGA 118 is comprised of a suspension 205 and a read/write head 210. The suspension 205 comprises a resilient load beam 215 and a flexure 220 to which the head 210 is secured.

The head 210 is formed of a slider 225 secured to the free end of the load beam 215 by means of the flexure 220 and a recording element 230 supported by the slider 225. In the example illustrated in FIG. 2, the recording element 230 is secured to the trailing edge 235 of the slider 225. The slider 225 can be any conventional or available slider.

Figure 3:
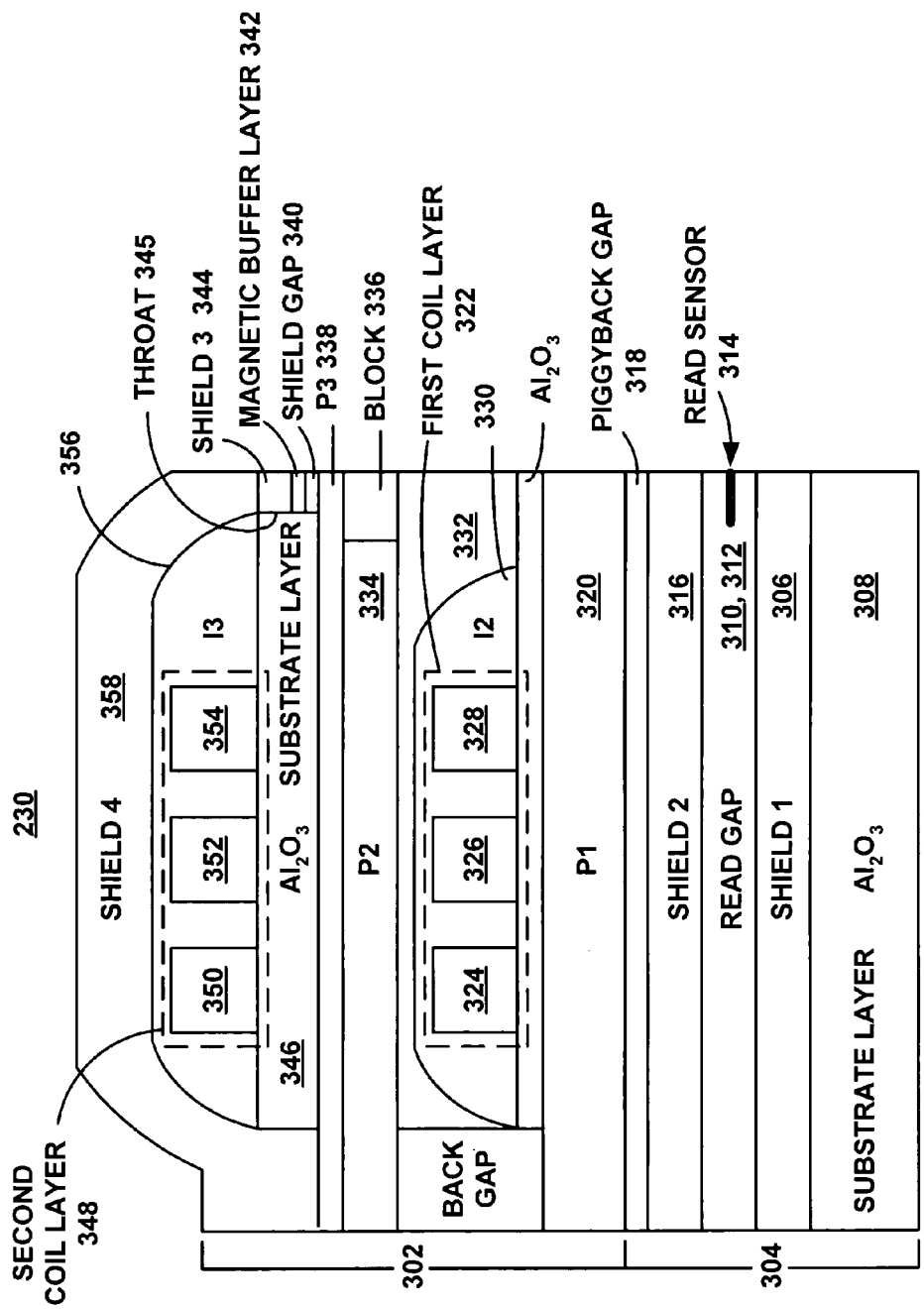
FIG. 3 is a cross-section view of a thin film recording element forming part of the recording element of FIGS. 1 and 2, and made according to the present invention.

FIG. 3 is a cross-sectional view of the recording element 230. The recording element 230 integrates a write element 302 and a read element 304. The read element 304 is formed of a first shield layer (shield 1) 306 that is formed on a substrate layer 308. The substrate layer 308 is made of alumina ($Al_2O_3$).

The first shield layer 306 is made of a material that is both magnetically and electrically conductive. As an example, the first shield layer 306 can have a nickel iron (NiFe) composition, such as Permalloy, or a ferromagnetic composition with high permeability. The thickness of the first shield layer 306 can be in the range of approximately 0.5 micron to approximately 20 microns.

An insulation layer 310 is formed over substantially the entire surface of the first shield layer 306 to define a non-magnetic, transducing read gap 312. The insulation layer 310 can be made of any suitable material, for example alumina ($Al_2O_3$), aluminum oxide, or silicon nitride.

The read element 304 also comprises a read sensor 314 (FIG. 4) formed within the insulation layer 310. The read sensor 314 can be any suitable sensor, including but not limited to a magnetoresistive (MR) element, a giant magnetoresistive (GMR) element, a spin valve, a current-in-the-plane mode (CIP) sensor, a tunneling magnetoresistive (TMR) element, or a current-perpendicular-to-the-plane mode (CPP) sensor.

The read element 304 further comprises a second shield layer (shield 2) 316 that is made of an electrically and magnetically conductive material that may be similar or equivalent to that of the first shield layer 306. The second shield layer 316 is formed over substantially the entire surface of the insulating layer 310 and has a thickness that can be substantially similar or equivalent to that of the first shield layer 306.

A piggyback gap 318 is formed on the second shield layer 316 to separate the second shield S2 and the first pole P1. The piggyback gap 318 may be made of any suitable non-magnetic material such as alumina.

The write element 302 is comprised of a first pole or pole layer (P1) 320 that extends, for example, integrally from the piggyback gap 318. The first pole P1 is made of a magnetically conductive material.

A first coil layer 322 comprises conductive coil elements (or conductors) represented by conductors 324, 326, 328.

The first coil layer 322 also forms part of the write element 302, and is formed within an insulating layer (I2) 330. The first coil layer 322 may comprise a single layer of, for example, 1 to 30 turns, though a different number of turns can alternatively be selected depending on the application or design. The insulating layer 330 is covered by a substrate layer 332 comprised of, for example.

A second pole or pole layer (P2) 334 is made of a magnetically conductive material, and may be, for example, similar to that of the first shield layer 306 and the first pole P1. The second pole layer 334 is recessed from the air-bearing surface by a block 336 that is made, for example, of non-magnetic material such as alumina. Block 336 and substrate layer 332 may be formed of the same material. The thickness of the second pole layer 334 can be substantially the same as, or similar to, that of the first shield layer 306.

A third pole or pole layer (P3) 338 is made of a hard magnetic material with a high saturation magnetic moment Bs. In a preferred embodiment, the saturation magnetic moment Bs is equal to or greater than 2.0 teslas. The third pole layer 338 can be made, for example, of CoFeN, CoFeNi, CoFe.

A shield gap 340 can be made, for example, of alumina, NiCr, Ta. A magnetic buffer layer 342 is applied to the shield gap 340. A third shield layer (shield 3) 344 is formed on the magnetic buffer layer 342. A substrate layer 346 that is made, for example, of alumina, is formed on the third pole layer 338 to the same level as that of the third shield layer 344.

A second coil layer 348 comprises conductive coil elements (or conductors) represented by conductors 350, 352, 354. The second coil layer 348 forms part of the read element 304, and is formed within an insulating layer (I3) 356. The second coil layer 348 may comprise a single layer of, for example, 1 to 30 turns, though a different number of turns can alternatively be selected depending on the application or design. The insulating layer 356 is covered by a fourth shield layer (shield 4) that is also referred to as upper shield 358.

Figure 4:
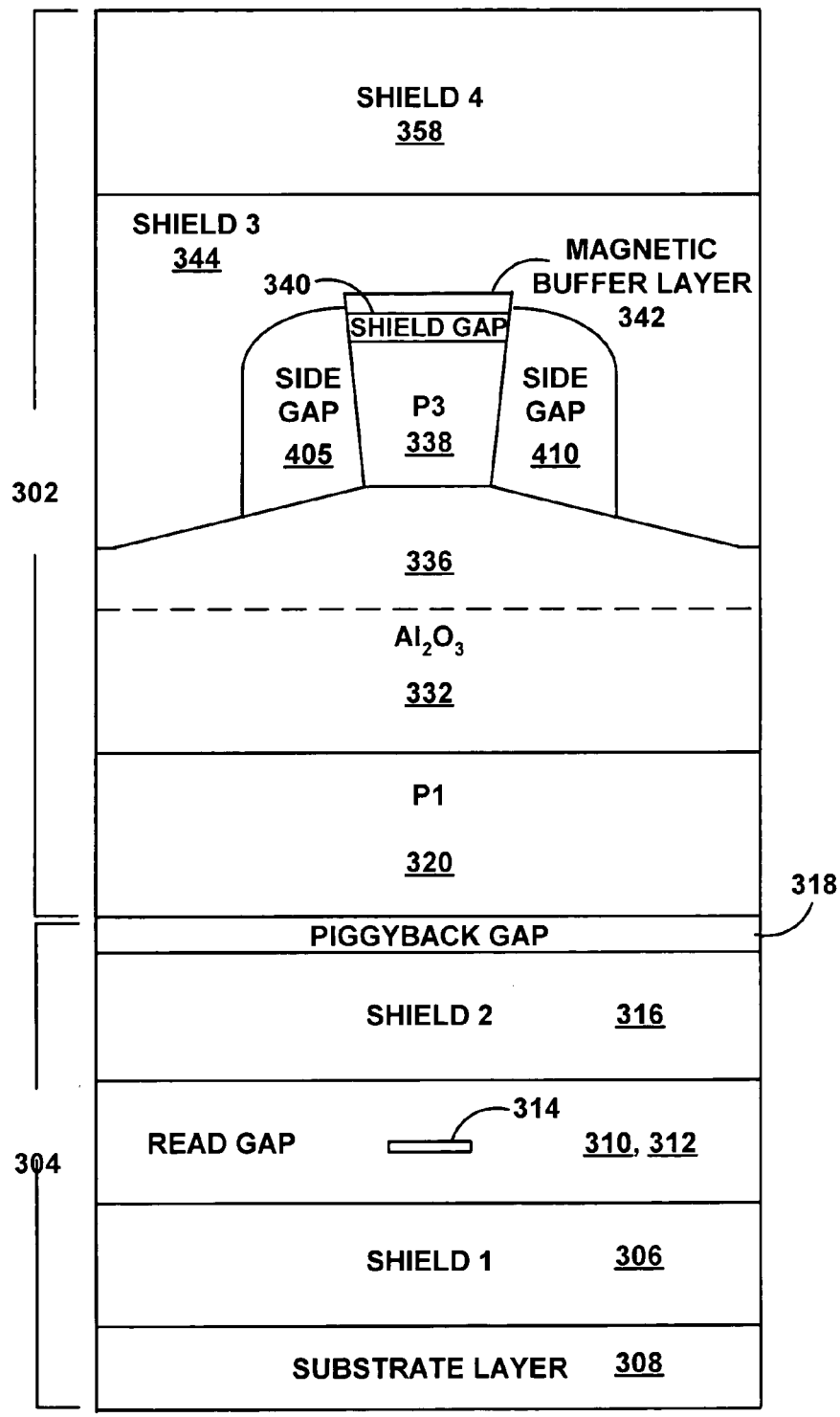
FIG. 4 is an ABS view of the recording head in which the write element of the present invention may be used.

Referring now to FIG. 4, it illustrates the air-bearing surface of the recording element 220, and shows two side gaps 405, 410, one on each side of the third pole 338. Side gaps 405, 410 are made for example of SiN, $SiO_2$, or Si.

Figure 5A:
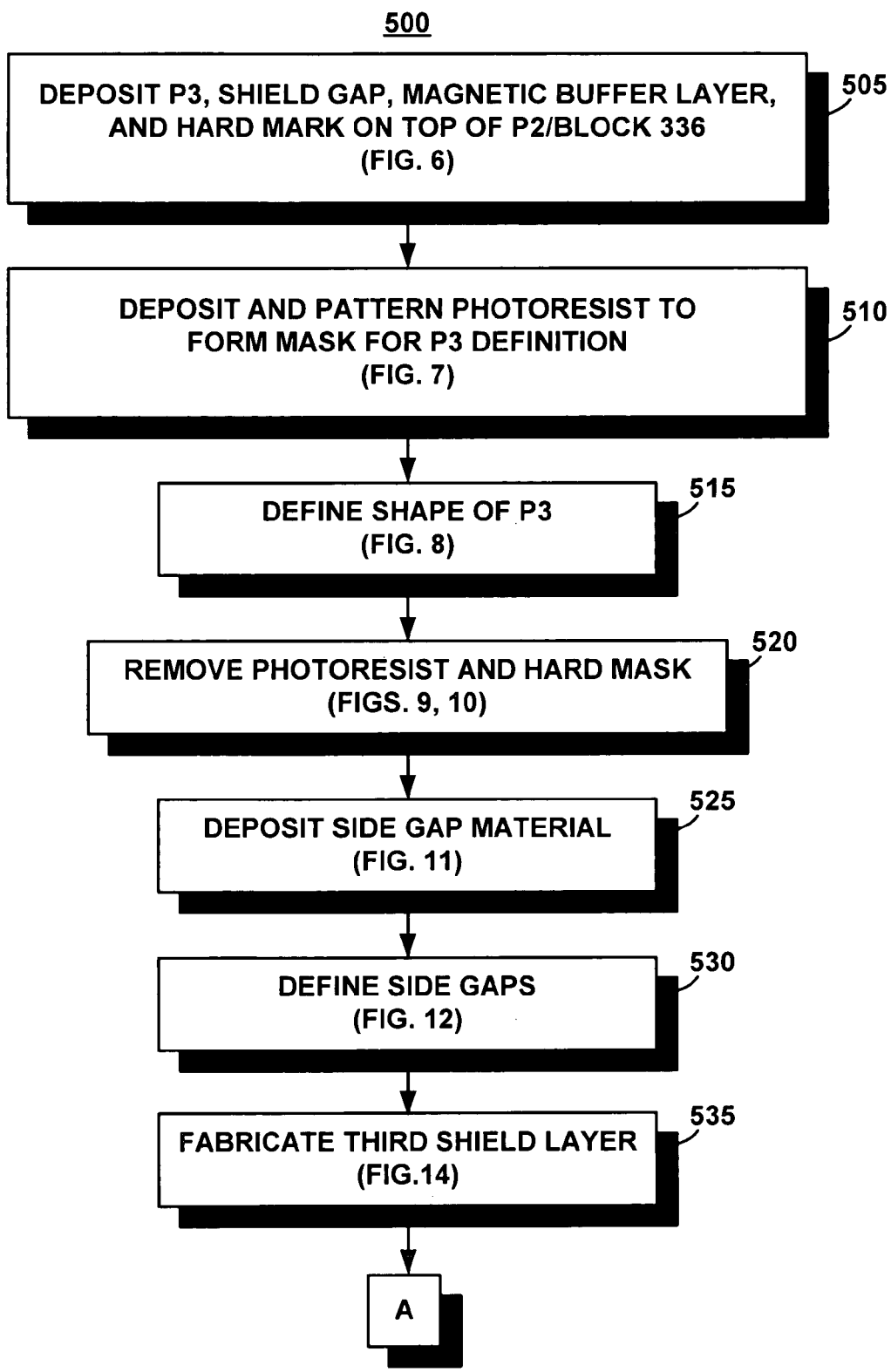
FIG. 5 is comprised of FIGS. 5A and 5B and represents a process flow chart illustrating a method of fabrication of the write element of FIGS. 1, 2, 3, and 4.
Figure 5B:
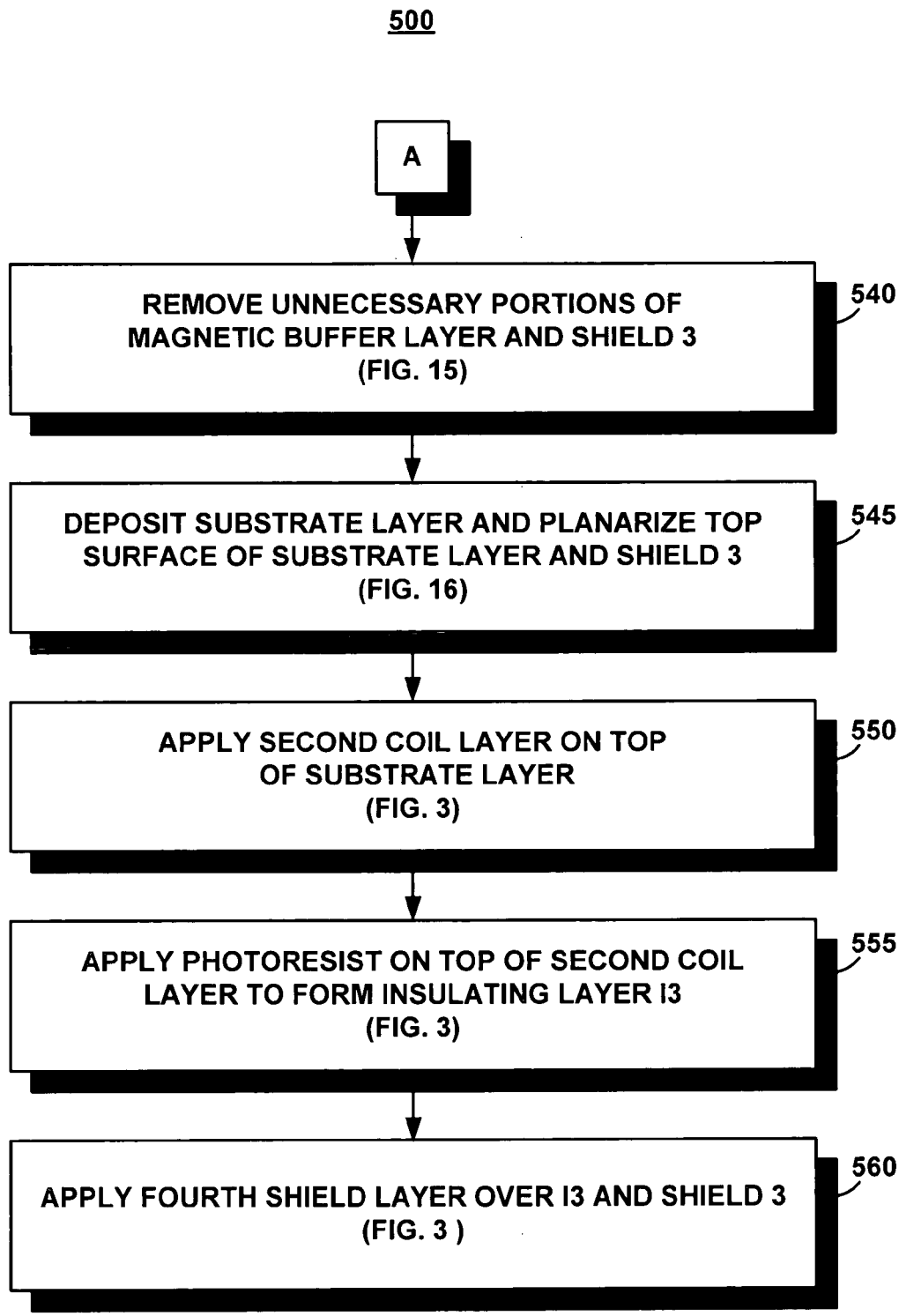
Figure 6:
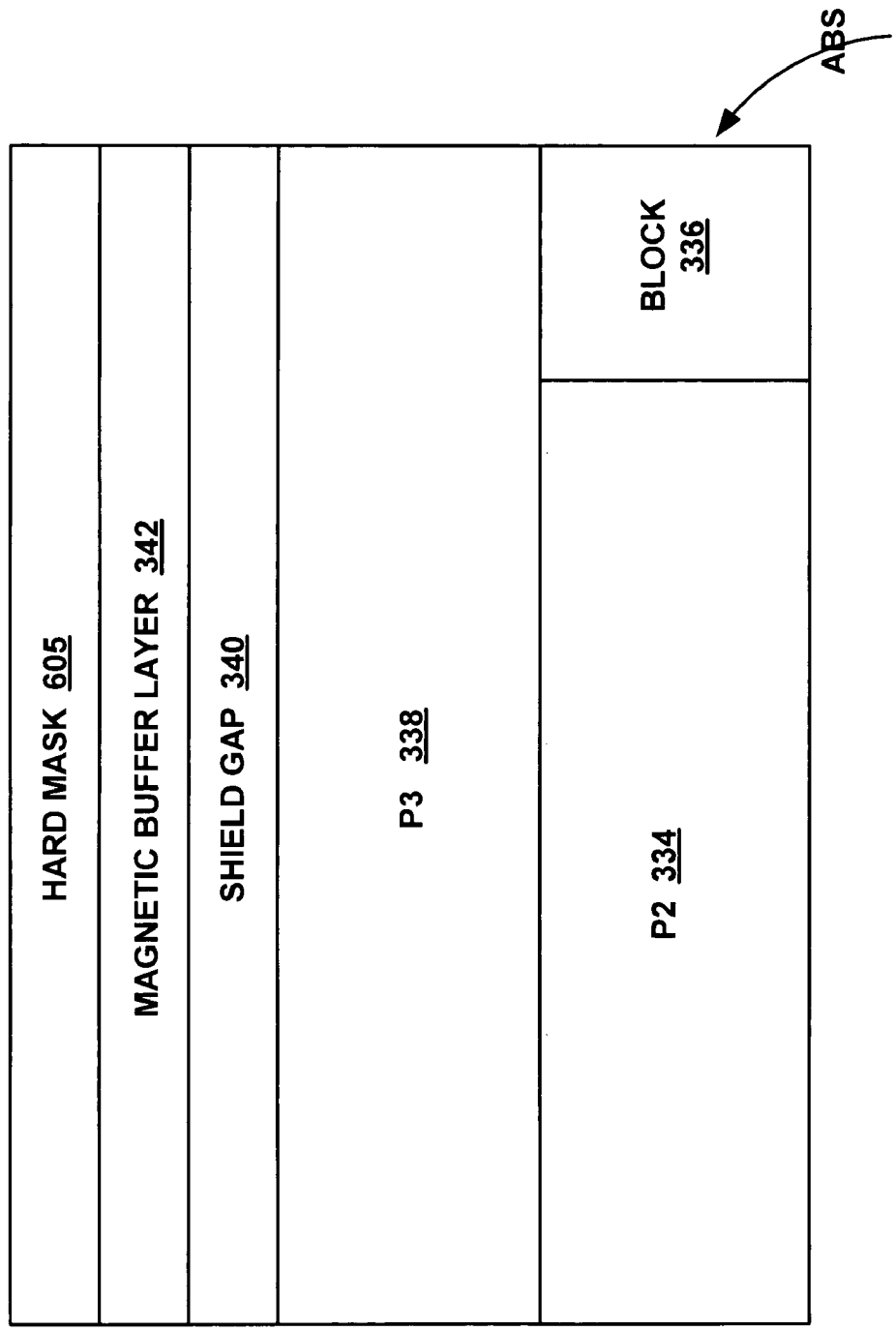
FIG. 6 is a side cross-sectional view illustrating a fabrication step of the write element after application of a pole P3, a shield gap, a magnetic buffer layer, and a hard mask.

A method 500 of fabricating the write element 302 is illustrated by the process flow chart of FIG. 5 (FIGS. 5A, 5B), with further reference to FIGS. 6 through 16. As illustrated by the cross-sectional view of FIG. 6, the third pole layer P3 338 is deposited on the second pole layer P2 334 and block 336, at step 505.

Second pole P2 334 is recessed from the ABS, and is formed behind block 336. Third pole P3 338 is made of a hard magnetic material such as, for example, CoFeN, CoFeNi, CoFe, or any high magnetic moment material. The shield gap 340 that is made for example of NiCr, $Al_2O_3$, Ta, NiNb, and NiFeCr, or any other non-magnetic metallic material or dielectric material, is deposited on the third pole P3 338.

A magnetic buffer layer 342 is deposited on the shield gap 340 and a hard mask 605 is deposited on top of the magnetic buffer layer 342. The magnetic buffer layer 342 may be comprised of, for example, NiFe, CoFe, CoFeN, and CoNiFe, or any other soft magnetic material. The hard mask 605 may be comprised of, for example, alumina or diamond-like carbon (DLC). In an embodiment, P3 338, the shield gap 340, and the magnetic buffer layer 342 are deposited by sputtering or ion beam deposition. The hard mask 605 may be deposited by sputtering, reactive sputtering, ion beam deposition, or atomic layer deposition. The hard mask 605 will be removed later, with a portion of the magnetic buffer layer 342 being left to form part of the third shield layer 344.

Figure 7:
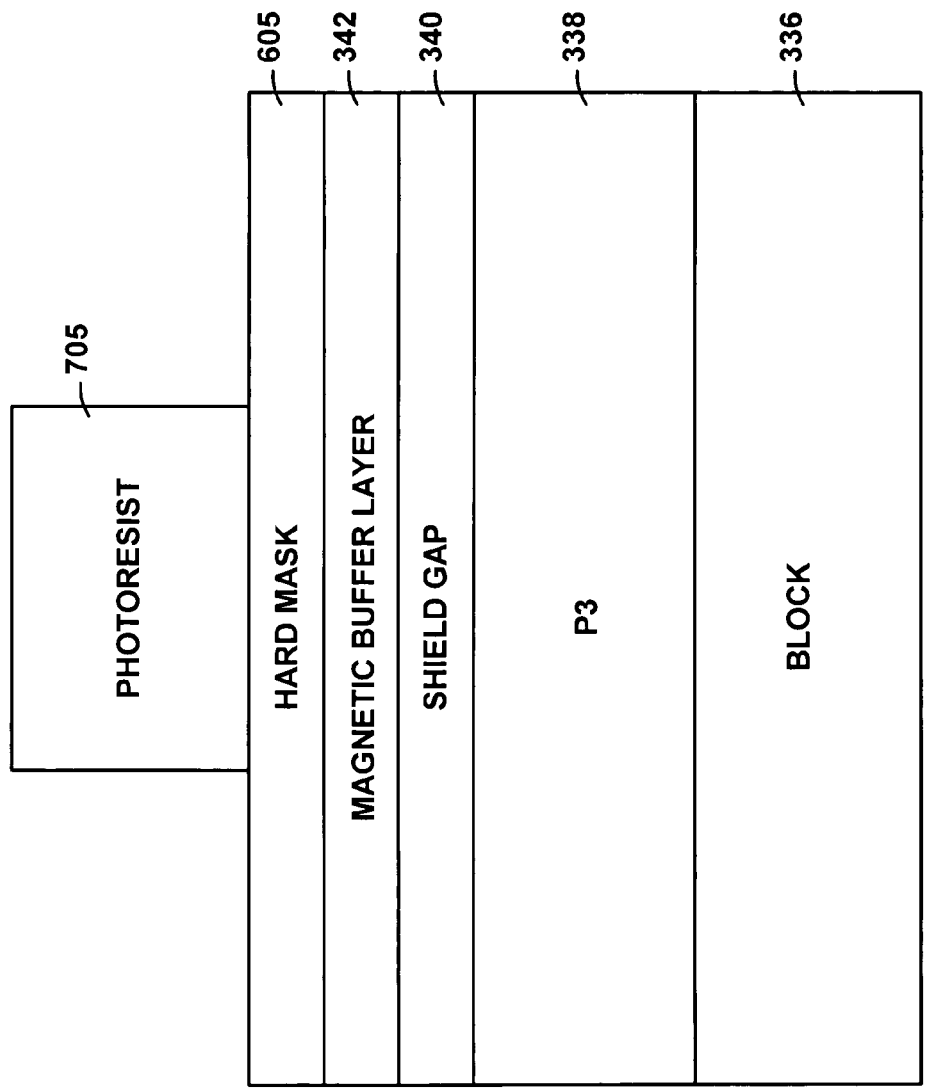
FIG. 7 is an ABS view illustrating a fabrication step of the write element after application of a layer of photoresist.

As illustrated in the ABS view of FIG. 7, photoresist 705 is deposited and patterned using, for example, photolithography to form a mask for definition of the third pole P3 338 (step 510).

Figure 8:
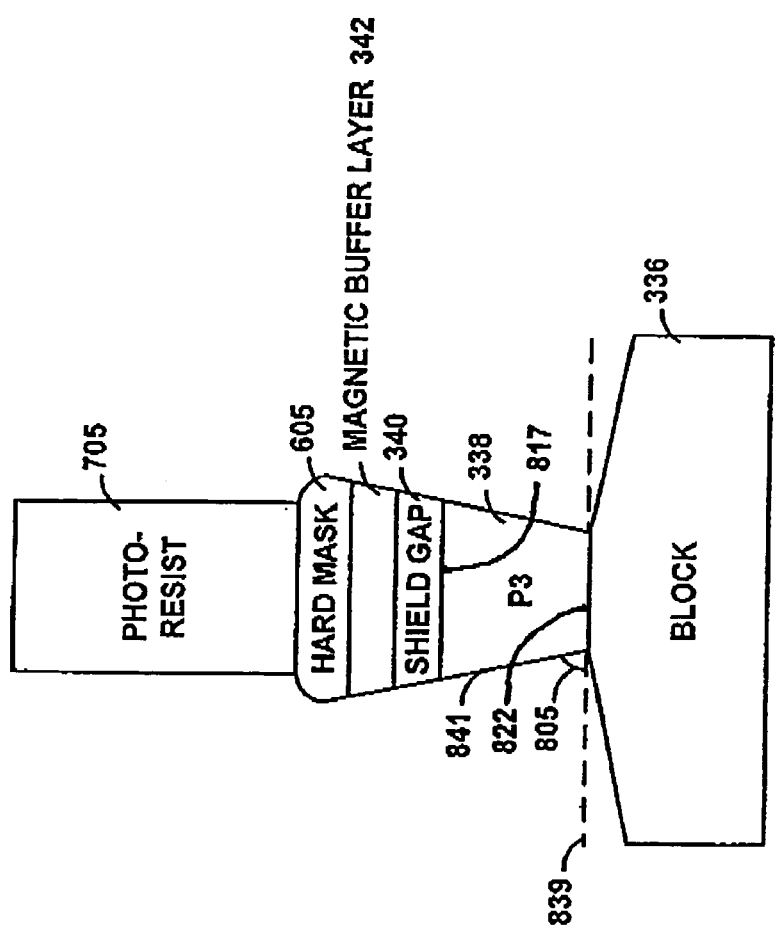
FIG. 8 is an ABS view illustrating a fabrication step of the write element after etching of the hard mask, the magnetic buffer layer, the shield gap, and the pole P3.

At step 515 of FIG. 5A, the shape of the third pole P3 338 is defined using, for example, ion beam etch or reactive ion beam etch (FIG. 8). The hard mask 605 is used to form an inclination angle 805 between a side 841 of the third pole P3 338 relative to a reference plane 839 (which is shown in this illustration in the horizontal plane).

The inclination angle 805 preferably varies between approximately 75 degrees and 90 degrees, and contributes to the creation of the generally trapezoidal shape of the third pole P3 338. Shaping the third pole P3 338 in a generally trapezoidal shape prevents, or significantly minimizes erasure of, or writing on side tracks when recording on the media 20. In one embodiment, the trapezoidal shape is such that the wider top 817 of the trapezoid is located in proximity to the shield gap 340, while the narrower base 822 is located in proximity to the block 336.

Figure 9:
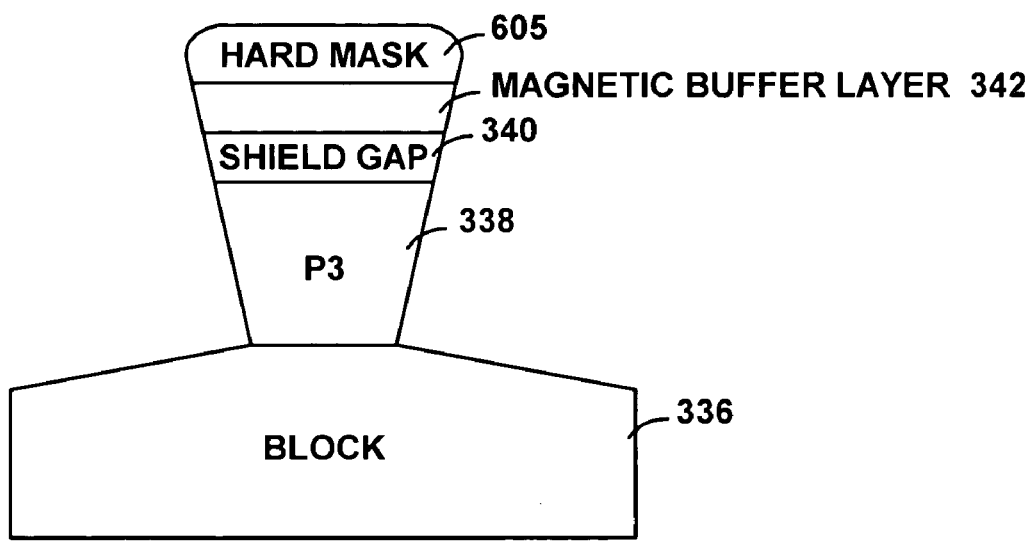
FIG. 9 is an ABS view illustrating a fabrication step of the write element after moving the layer of photoresist.
Figure 10:
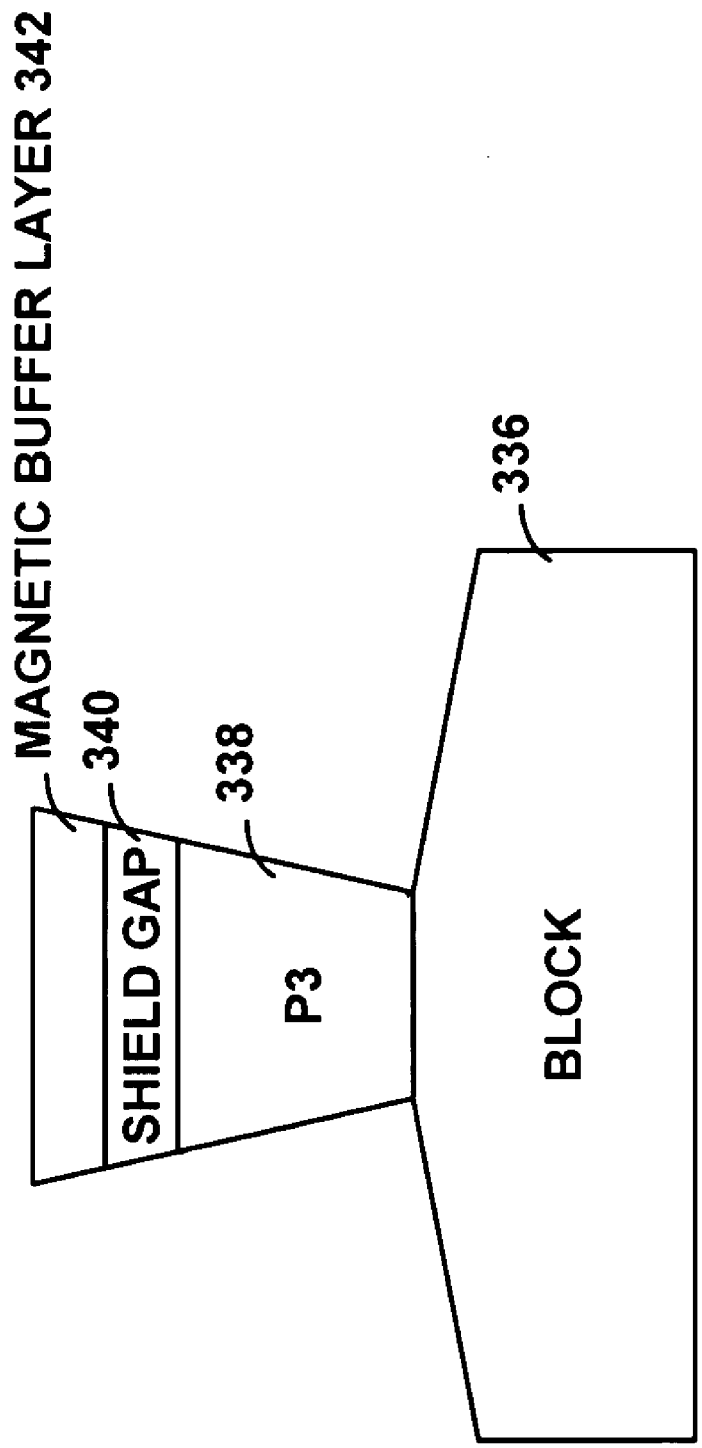
FIG. 10 is an ABS view illustrating a fabrication step of the write element after moving the hard mask.
Figure 11:
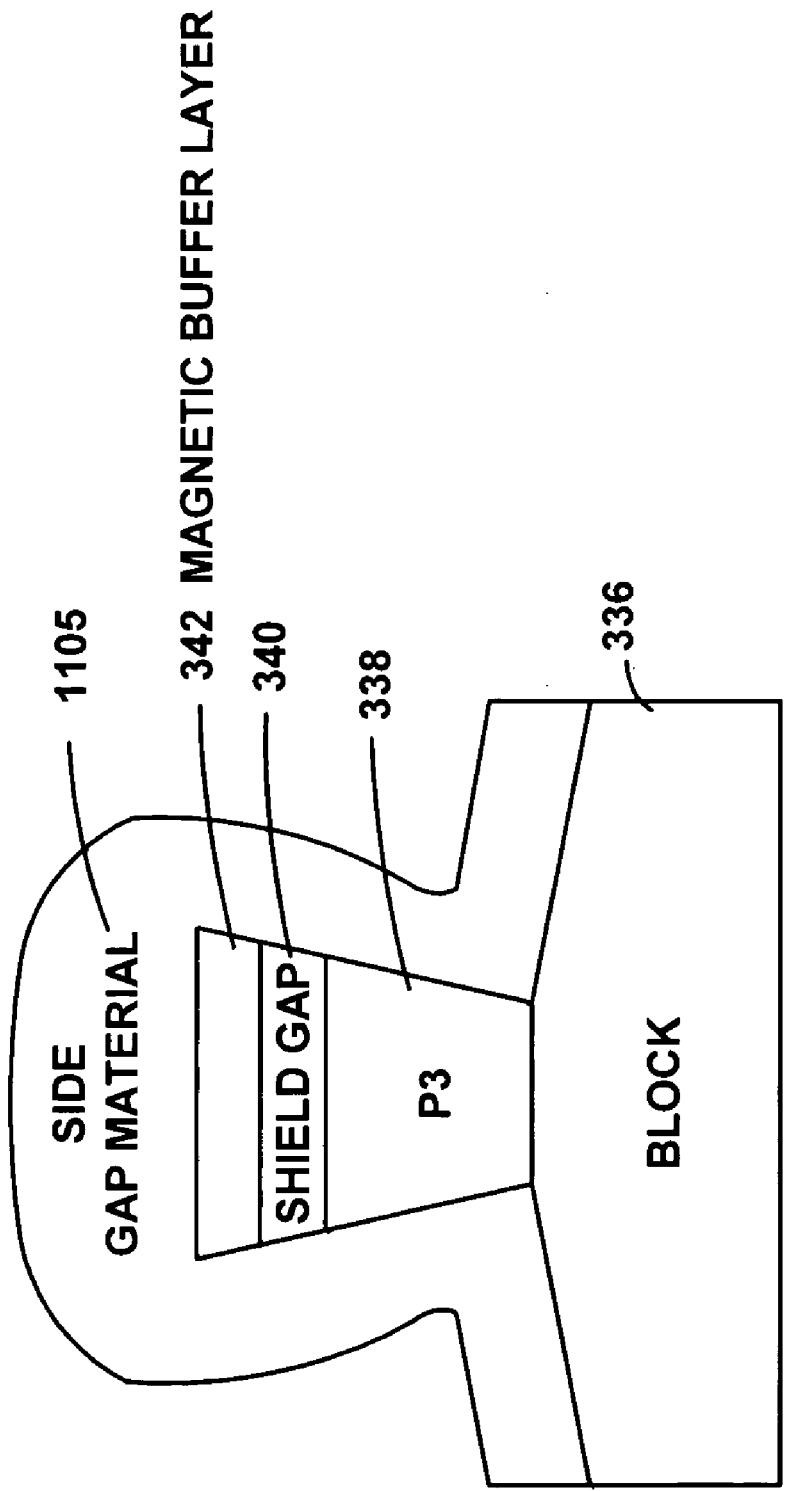
FIG. 11 is an ABS view illustrating a fabrication step of the write element after application of a layer of side gap material.
Figure 12:
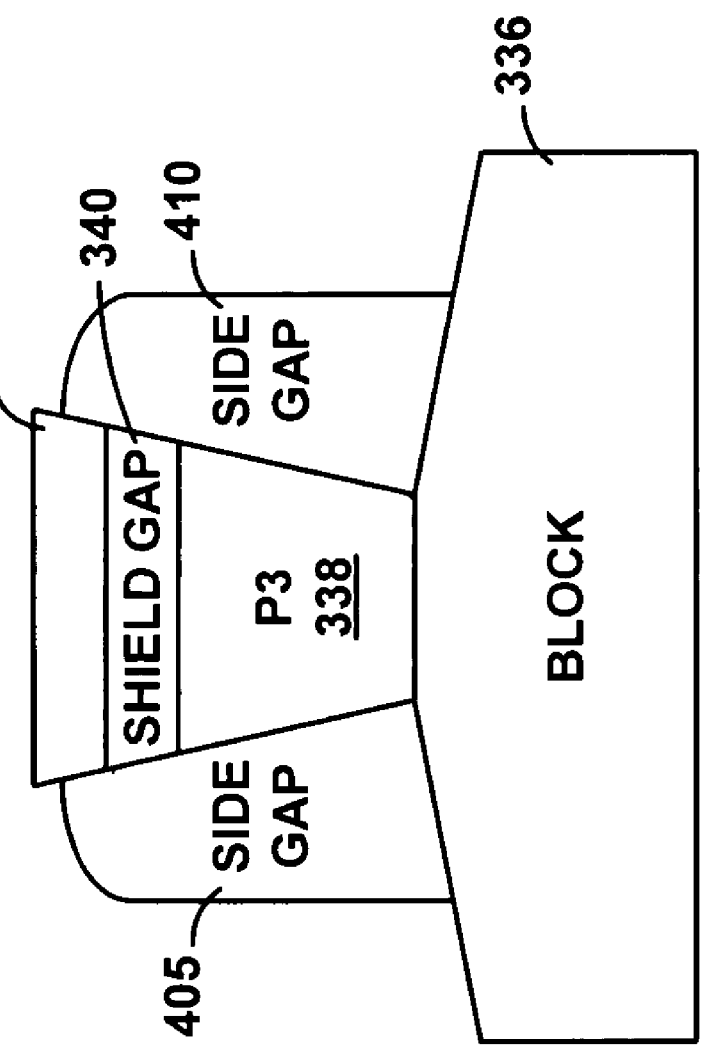
FIG. 12 is an ABS view illustrating a fabrication step of the write element after moving a portion of the side gap material to form side gaps on either side of the pole P3.

With further reference to FIG. 9, the photoresist 705 is removed at step 520. At step 520, the hard mask 605 is also removed using, for example, reactive ion etch or ion beam etch (FIG. 10). In one embodiment, the hard mask 605 is removed after side gaps 405, 410 are defined.

As illustrated in FIG. 1, a side gap material 1105 is deposited at step 525. The side gap material 1105 may be comprised of, for example, $Si_3N_4$, $SiO_2$, or Si. In one embodiment, the side gap material 1105 is deposited using PECVD. In another embodiment, the side gap material 1105 is deposited using sputtering, ion beam deposition, or inductively coupled plasma (ICP) chemical deposition. The side gap material 1105 uniformly covers the magnetic buffer layer 344, the shield gap 340, P3 338, block 336, and the recessed second pole P2 334 (FIG. 4).

The side gaps 405, 410 are defined at step 530 (FIG. 12) using, for example, an ion mill, reactive ion beam etch, or ICP etch. Since the etch rate is different depending on the incident angle of ions, the etch rate on top of the third pole P3 338 is faster than the side of the third pole P3 338. Consequently, a certain amount of side gap material remains after the side gap material 1105 is removed from the magnetic buffer layer 342, to form the side gaps 405, 410. The thickness and shape of the side gaps 405, 410 can be controlled by the varying the etch process conditions.

Figure 13:
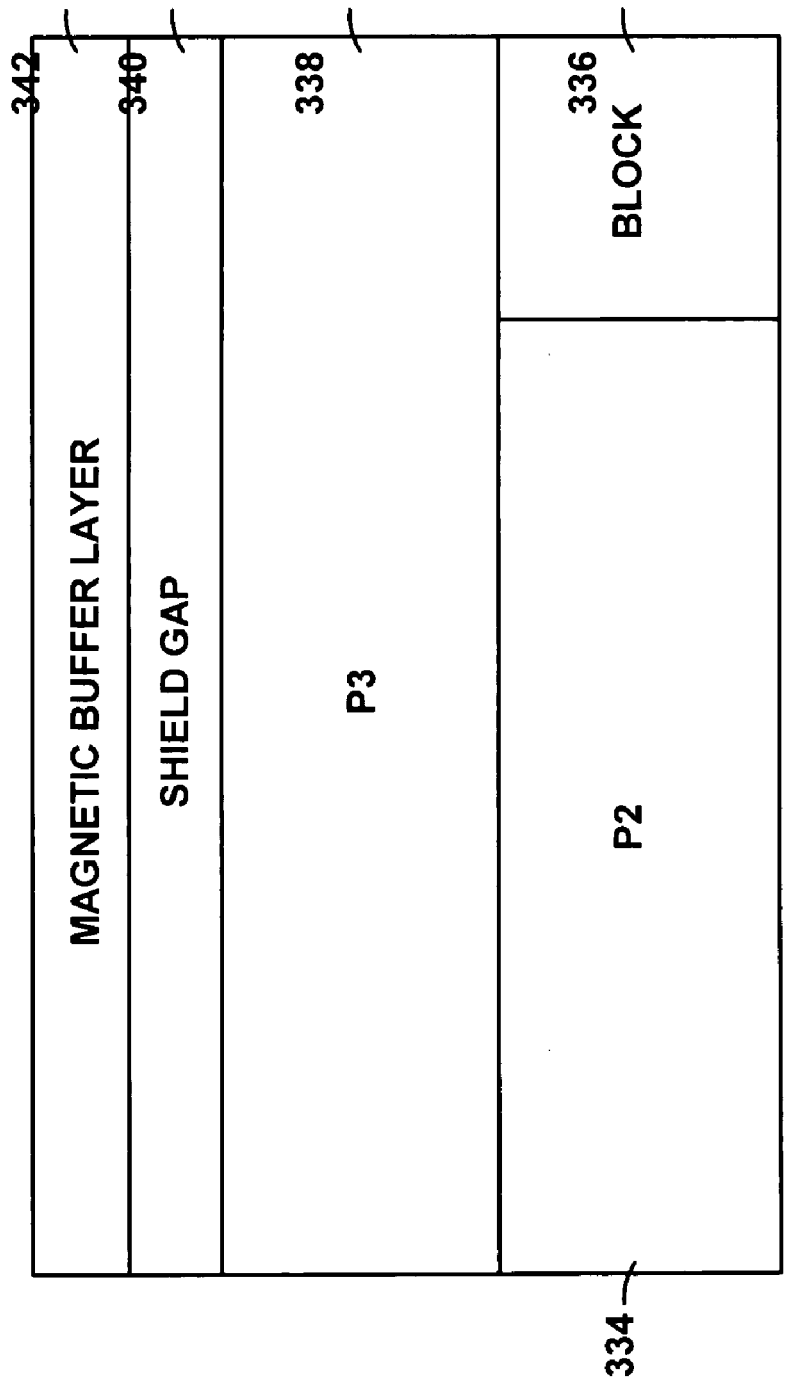
FIG. 13 is a cross-section view illustrating a fabrication step of the write element as shown in FIG. 12.

A cross-sectional view of the writing element 302 formed thus far is illustrated in FIG. 13. The second pole P2 334 is recessed from the ABS by block 336. At this stage, the third pole P3 338 has been deposited on P2 334 and block 336. The shield gap 340 is deposited on the third pole P3. The magnetic buffer layer 342 is deposited on the shield gap 340.

Figure 14:
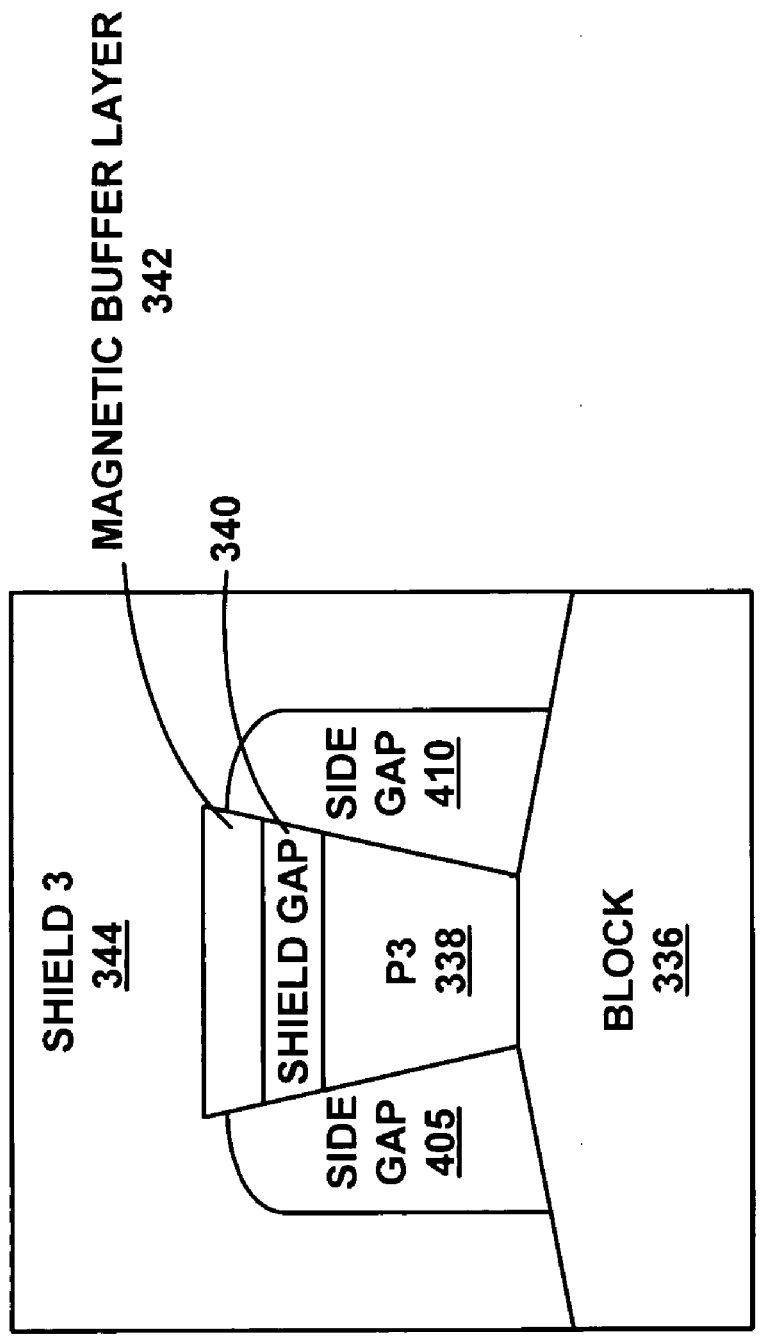
FIG. 14 is an ABS view illustrating a fabrication step of the write element after application of a third shield layer.

The third shield layer 344 is fabricated at step 535 using seed deposition, photolithography, and plating, as illustrated in FIG. 14. The third shield layer 344 covers the magnetic buffer layer 342, the side gaps 405, 420, the block 336, and the second pole P2 334 (FIG. 3). The third shield layer 344 may be comprised, for example, of NiFe.

In one embodiment, the third shield layer 344 is comprised of the same material as the magnetic buffer layer 342. A seed that is made for example of NiFe, is deposited on the wafer comprising the third pole P3 338 of the writing element 302.

The third shield layer 344 is defined using photoresist and lithography, and then plated. Plating the third shield layer 344 also precisely defines a throat 345 and the corresponding throat height. The fabrication control of step 535 is important because precision in the throat height is required. Though in a preferred embodiment the shield gap 340 is shown in FIG. 3 to extend to the back of the third shield layer 344, the shield gap 340 could alternatively extend to the back as shown in FIG. 15.

Figure 15:
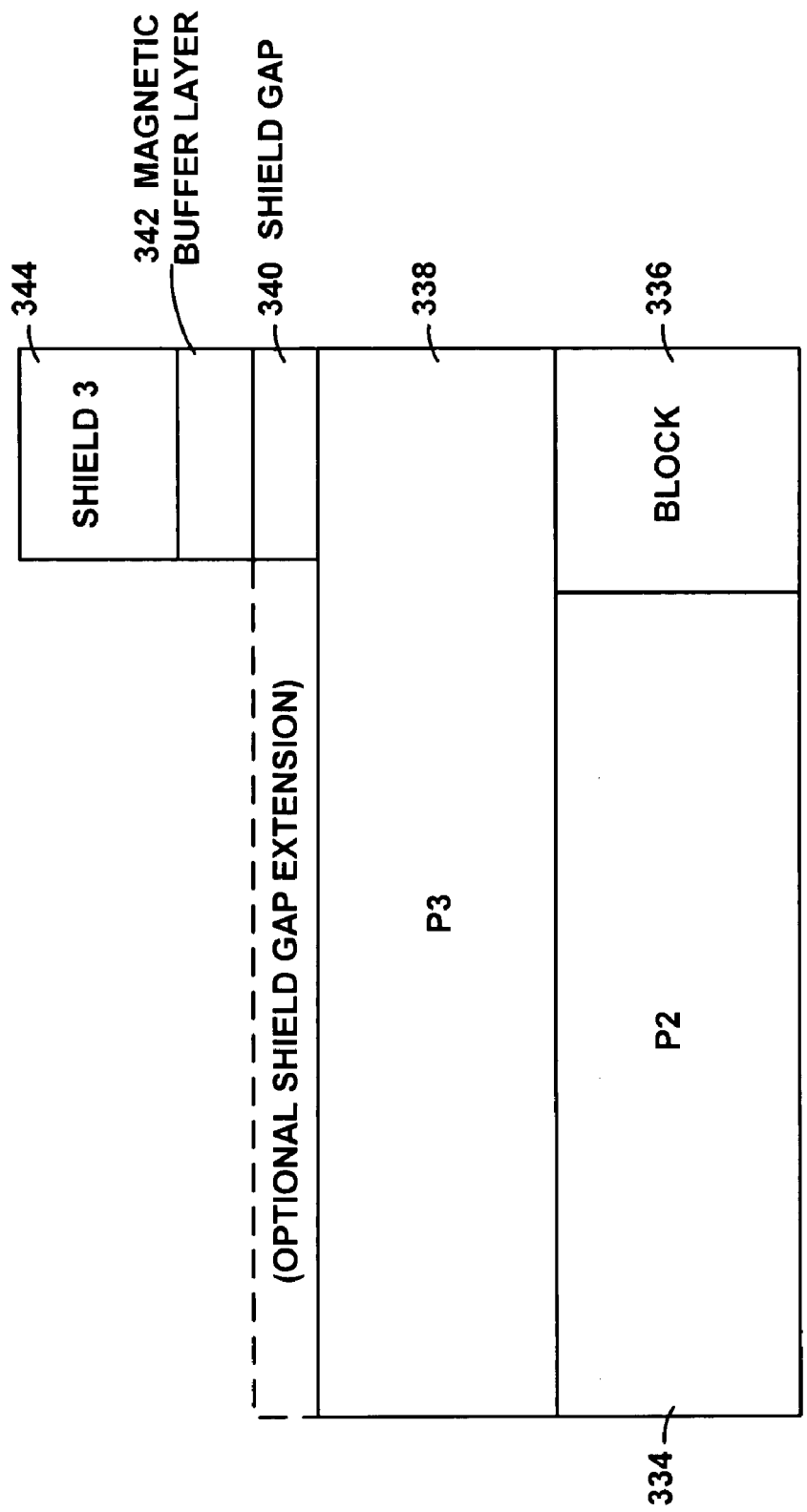
FIG. 15 is a cross-section view illustrating a fabrication step of the write element after a portion of the third shield layer and the magnetic buffer layer have been removed.
Figure 16:
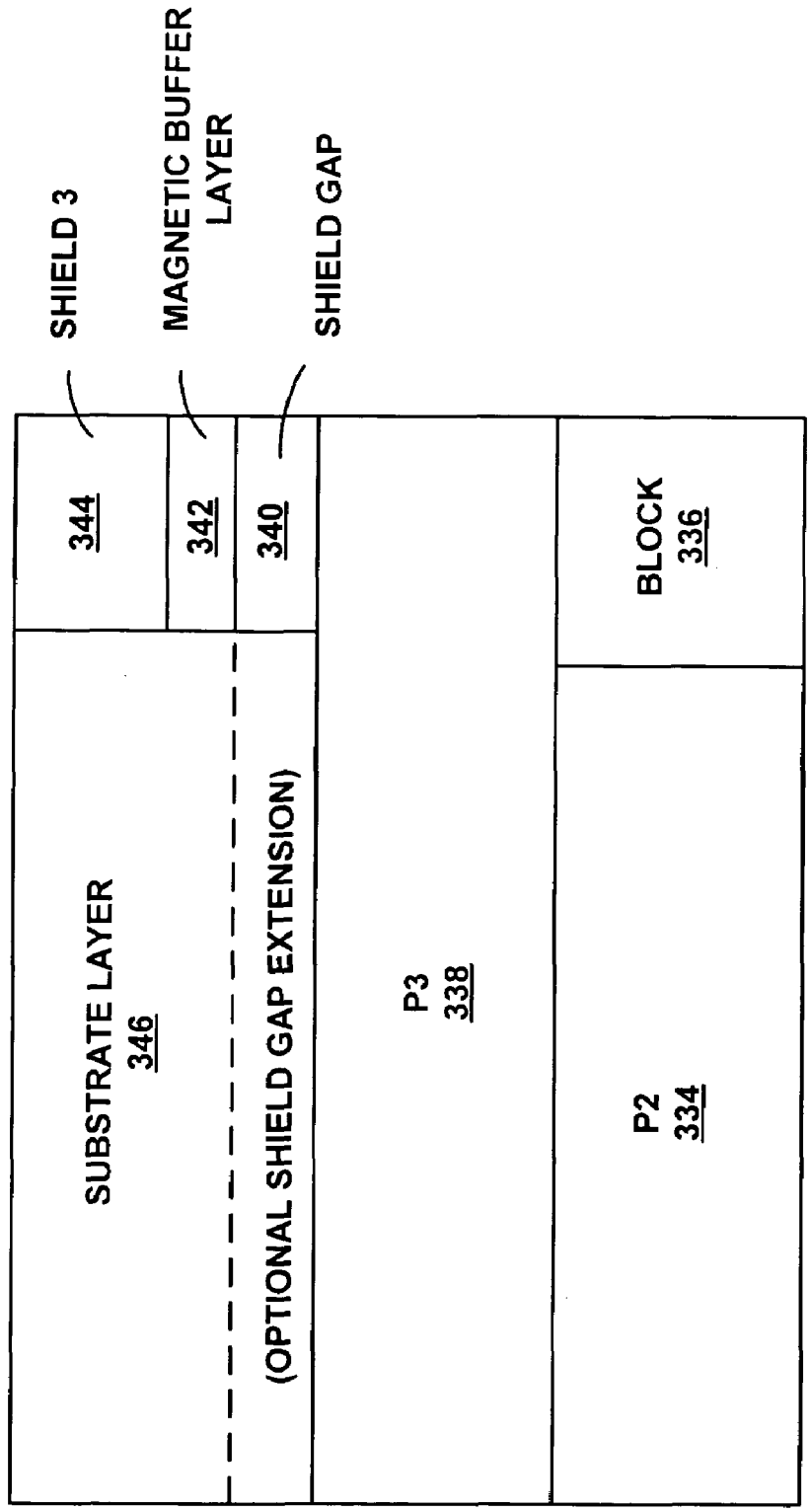
FIG. 16 is a cross-section view illustrating a fabrication step of the write element after a substrate layer has been added behind the third shield layer and the magnetic buffer layer.

At step 540 (FIG. 5B), all unnecessary portions of the third shield layer 344 and magnetic buffer layer 342 are removed as illustrated in FIG. 15. As illustrated in FIG. 16, substrate layer 346 is deposited on the shield gap 340, the side gaps 405, 410, the second pole P2 334, and a portion of block 336 (step 545). The third shield layer 344 and the substrate layer 346 are then planarized to the same level.

The recording element 230 is then completed as shown in FIGS. 3 and 4, by applying the second coil layer 348 on top of substrate layer 346 (step 550). An on layer 13 356 that is made for example of photoresist, is applied on top of the coil layer 348 at step 555.

The fourth shield layer 358 is formed on the insulation layer 13 356 and the third shield layer 344 using photolithography and plating (step 560). In one embodiment, the fourth shield layer 358 and the third shield layer 344 are made of the same material. In another embodiment, the fourth shield layer 358 and the third shield layer 344 are made of different materials.

What is claimed is:

1. A write element for use in perpendicular recording in a data storage system, comprising:
    a first pole P1 formed atop a read element;
    a first substrate layer formed over the first pole P1;
    a second pole P2 that defines a recess;
    a non-magnetic material that is deposited in the recess;
    a third pole P3 that is deposited atop at least part of the second pole P2 and the non-magnetic material;
    a shield gap that is deposited over substantially an entire surface of the third pole P3;
    a magnetic buffer layer that is deposited over substantially an entire surface of the shield gap;
    the third pole P3 having a top and a base, the base of the third pole P3 being narrower than the top of the third pole P3;
    a side gap formed alongside the third pole P3, the shield gap, and the magnetic buffer layer; and
    a shield layer that is deposited substantially over an magnetic buffer layer, the side gap, and the non-magnetic material.

2. The write element of claim 1, wherein a shape of the third pole P3 is a generally trapezoidal shape.

3. The write element of claim 2, wherein the third pole P3 is shaped by depositing a photoresist layer on part of a hard mask.

4. The write element of claim 3, wherein the third pole P3 is shaped by etching the hard mask, the magnetic buffer layer, the shield gap, and the third pole P3.

5. The write element of claim 4, wherein the third pole P3 is shaped by removing the photoresist layer and the hard mask.

6. The write element of claim 5, wherein the side gap is formed by depositing a side gap material to cover the magnetic buffer layer, the shield gap, the third pole P3, the second pole P2, and the non-magnetic material.

7. The write element of claim 6, wherein the side gap is formed by etching the side gap material to define two side gaps on either side of the third pole P3.

8. The write element of claim 7, further comprising a throat that is defined by partially removing the shield layer and the magnetic buffer layer.

9. The write element of claim 8, further comprising a second substrate layer that is deposited behind the throat, on top of the third pole P3 and the second pole P2, and that extends to a rearward edge of the third pole P3.

10. The write element of claim 9, wherein a top surface of the second substrate layer and a top surface of the shield layer are planarized to the same level.

11. The write element of claim 9, further comprising a first coil layer that is formed in the first substrate layer.

12. The write element of claim 11, further comprising a second coil layer that is formed in a third substrate layer, on top of the second substrate layer.

13. The write element of claim 12, further comprising a fourth shield layer that is deposited over the third substrate layer.

14. The write element of claim 2, wherein the third pole P3 defines an inclination angle between a side of the third pole P3 and a reference plane.

15. The write element of claim 14, wherein the inclination angle varies between approximately 80 degrees and 90 degrees.

16. The write element of claim 15, wherein the top of the third pole P3 is located in proximity to the shield gap and the base of the third pole P3 is located in proximity to the non-magnetic material in the recess.

17. The write element of claim 1, wherein the shield gap is made essentially of a magnetic material.

18. The write element of claim 1, wherein the shield gap is made of a dielectric material.

19. The write element of claim 1, wherein the shield gap is selected from a group comprised essentially of: NiCr, $Al_2O_3$, Ta, NiNb, and NiFeCr.

20. The write element of claim 1, wherein the magnetic buffer layer is made essentially of a high moment magnetic material.

21. The write element of claim 20, wherein the magnetic buffer layer is selected from a group comprised essentially of: NiFe, CoFe, CoFeN, and CoNiFe.

22. The write element of claim 1, wherein the magnetic buffer layer is made of a soft magnetic material.

23. The write element of claim 1, wherein the hard mask is made essentially of $Al_2O_3$ and DLC.

24. The write element of claim 1, wherein the hard mask is made essentially of diamond-like carbon material.

25. The write element of claim 1, wherein the side gap is made essentially of dielectric material.

26. The write element of claim 25, wherein the side gap is selected from a group comprised essentially of: $Si_3N_4$, $SiO_2$, and Si.

27. The write element of claim 1, wherein the third pole P3 is made of a high saturation magnetic moment material.

28. The write element of claim 1, wherein the third pole P3 has a saturation magnetic moment is at least greater than 2.0 teslas.

29. The write element of claim 28, wherein the third pole P3 is selected from a group comprised essentially of: CoFeN, CoFeNi, CoFe.

30. A head for use in perpendicular recording in a data storage system, comprising:
    a first pole P1 formed atop a read element;
    a first substrate layer formed over the first pole P1;
    a second pole P2 that defines a recess;
    a non-magnetic material that is deposited in the recess;

a third pole P3 that is deposited atop at least part of the second pole P2 and the non-magnetic material;

a shield gap that is deposited over substantially an entire surface of the third pole P3;

a magnetic buffer layer that is deposited over substantially an entire surface of the shield gap;

the third pole P3 having a top layer and a base, the base of the third pole P3 being narrower than the top of the third pole P3;

a side gap formed alongside the third pole P3, the shield gap, and the magnetic buffer layer; and a shield layer that is deposited substantially over the magnetic buffer layer, the side gap, and the non-magnetic material.

31. The head of claim 30, wherein a shape of the third pole P3 is a generally trapezoidal shape.

32. The head of claim 31, wherein the third pole P3 is shaped by depositing a photoresist layer on part of a hard mask.

33. The head of claim 32, wherein the third pole P3 is shaped by etching the hard mask, the magnetic buffer layer, the shield gap, and the third pole P3.

34. The head of claim 33, wherein the third pole P3 is shaped by removing the photoresist layer and the hard mask.

35. The head of claim 34, wherein the side gap is formed by depositing a side gap material to cover the magnetic buffer layer, the shield gap, the third pole P3, the second pole P2, and the non-magnetic material.

36. The head of claim 35, wherein the side gap is formed by etching the side gap material to define two side gaps on either side of the third pole P3.

37. The head of claim 36, further comprising a throat that is defined by partially removing the shield layer and the magnetic buffer layer.

38. The head of claim 37, further comprising a second substrate layer that is deposited behind the throat, on top of the third pole P3 and the second pole P2, and that extends to a rearward edge of the third pole P3.

39. The head of claim 38, wherein a top surface of the second substrate layer and a top surface of the shield layer are planarized to the same level.

40. The head of claim 38, further comprising a first coil layer that is formed in the first substrate layer.

41. The head of claim 40, wherein the magnetic buffer layer is selected from a group comprised essentially of NiFe, CoFe, CoFeN, and CoNiFe.

42. The head of claim 40, further comprising a second coil layer that is formed in a third substrate layer, on top of the second substrate layer.

43. The head of claim 42, further comprising a fourth shield layer that is deposited over the third substrate layer.

44. The head of claim 31, wherein the third pole P3 defines an inclination angle between a side of the third pole P3 and a reference plane.

45. The head of claim 44, wherein the inclination angle varies between approximately 80 degrees and 90 degrees.

46. The head of claim 45, wherein the top of the third pole P3 is located in proximity to the shield gap and the base of the third pole P3 is located in proximity to the non-magnetic material in the recess.

47. The head of claim 30, wherein the shield gap is made essentially of a magnetic material.

48. The head of claim 30, wherein the shield gap is made of a dielectric material.

49. The head of claim 30, wherein the shield gap is selected from a group comprised essentially of: NiCr, $Al_2O_3$, Ta, NiNb, and NiFeCr.

50. The head of claim 30, wherein the magnetic buffer layer is made essentially of a high moment magnetic material.

51. The head of claim 30, wherein the magnetic buffer layer is made of a soft magnetic material.

52. The head of claim 30, wherein the hard mask is made essentially of $Al_2O_3$ and DLC.

53. The head of claim 30, wherein the hard mask is made essentially of diamond-like carbon material.

54. The head of claim 30, wherein the side gap is made essentially of dielectric material.

55. The head of claim 54, wherein the side gap is selected from a group comprised essentially of: $Si_3N_4$, $SiO_2$, and Si.

56. The head of claim 30, wherein the third pole P3 is made of a high saturation magnetic moment material.

57. The head of claim 30, wherein the third pole P3 has a saturation magnetic moment is at least greater than 2.0 teslas.

58. The head of claim 28, wherein the third pole P3 is selected from a group comprised essentially of: CoFeN, CoFeNi, CoFe.

59. A disk drive comprising:
a base;
a spindle motor attached to the base;
a disk positioned on the spindle motor;
a head stack assembly coupled to the base and comprising:
an actuator body;
an actuator arm cantilevered from the actuator body; and
a head for use in perpendicular recording;
the head including:
a first pole P1 formed atop a read element;
a first substrate layer formed over the first pole P1;
a second pole P2 that defines a recess;
a non-magnetic material that is deposited in the recess;
a third pole P3 that is deposited atop at least part of the second pole P2 and the non-magnetic material;
a shield gap that is deposited over substantially an entire surface of the third pole P3;
a magnetic buffer layer that is deposited over substantially an entire surface of the shield gap;
the third pole P3 having a top and a base, the of the third pole P3 P3 being narrower than the top of the third pole P3;
a side gap formed alongside the third pole P3, the shield gap, and the magnetic buffer layer; and
a shield layer that is deposited substantially over the magnetic buffer layer, the side gap, and the non-magnetic material.

60. The disk drive of claim 59, wherein a shape of the third pole P3 is a generally trapezoidal shape.

61. The disk drive of claim 60, wherein the third pole P3 is shaped by depositing a photoresist layer on part of a hard mask.

62. The disk drive of claim 61, wherein the third pole P3 is shaped by etching the hard mask, the magnetic buffer layer, the shield gap, and the third pole P3.

63. The disk drive of claim 62, wherein the third pole P3 is shaped by removing the photoresist layer and the hard mask.

64. The disk drive of claim 63, wherein the side gap is formed by depositing a side gap material to cover the magnetic buffer layer, the shield gap, the third pole P3, the second pole P2, and the non-magnetic material.

65. The disk drive of claim 64, wherein the side gap is formed by etching the side gap material to define two side gaps on either side of the third pole P3.

66. The disk drive of claim 65, further comprising a throat that is defined by partially removing the shield layer and the magnetic buffer layer.

67. The disk drive of claim 66, further comprising a second substrate layer that is deposited behind the throat, on top of the third pole P3 and the second pole P2, and that extends to a rearward edge of the third pole P3.

68. The disk drive of claim 67, wherein a top surface of the second substrate layer and a top surface of the shield layer are planarized to the same level.

69. The disk drive of claim 67, further comprising a first coil layer that is formed in the first substrate layer.

70. The disk drive of claim 69, wherein the magnetic buffer layer is selected from a group comprised essentially of: NiFe, CoFe, CoFeN, and CoNiFe.

71. The disk drive of claim 70, further comprising a second coil layer that is formed in a third substrate layer, on top of the second substrate layer.

72. The disk drive of claim 69, wherein the magnetic buffer layer is selected from a group comprised essentially of: NiFe, CoFe, CoFeN, and CoNiFe.

73. The disk drive of claim 60, wherein the third pole P3 defines an inclination angle between a side of the third pole P3 and a reference plane.

74. The disk drive of claim 73, wherein the inclination angle varies between approximately 80 degrees and 90 degrees.

75. The disk drive of claim 74, wherein the top of the third pole P3 is located in proximity to the shield gap and the base of the third pole P3 is located in proximity to the non-magnetic material in the recess.

76. The disk drive of claim 59, wherein the shield gap is made essentially of a magnetic material.

77. The disk drive of claim 59, wherein the shield gap is made of a dielectric material.

78. The disk drive of claim 59, wherein the shield gap is selected from a group comprised essentially of: NiCr, $Al_2O_3$, Ta, NiNb, and NiFeCr.

79. The disk drive of claim 59, wherein the magnetic buffer layer is made essentially of a high moment magnetic material.

80. The disk drive of claim 59, wherein the magnetic buffer layer is made of a soft magnetic material.

81. The disk drive of claim 59, wherein the hard mask is made essentially of $Al_2O_3$ and DLC.

82. The disk drive of claim 59, wherein the hard mask is made essentially of diamond-like carbon material.

83. The disk drive of claim 59, wherein the side gap is made essentially of dielectric material.

84. The disk drive of claim 83, wherein the side gap is selected from a group comprised essentially of $Si_3N_4$, $SiO_2$, and Si.

85. The disk drive of claim 59, wherein the third pole P3 is made of a high saturation magnetic moment material.

86. The disk drive of claim 59, wherein the third pole P3 has a saturation magnetic moment is at least greater than 2.0 teslas.

87. The disk drive of claim 86, wherein the third pole P3 is selected from a group comprised essentially of: CoFeN, CoFeNi, CoFe.

* * * * *